Feb. 14, 1939.　　　　G. A. JOHNSON　　　　2,146,956
FRICTION SHOCK ABSORBING MECHANISM
Filed Feb. 27, 1936　　　2 Sheets-Sheet 1
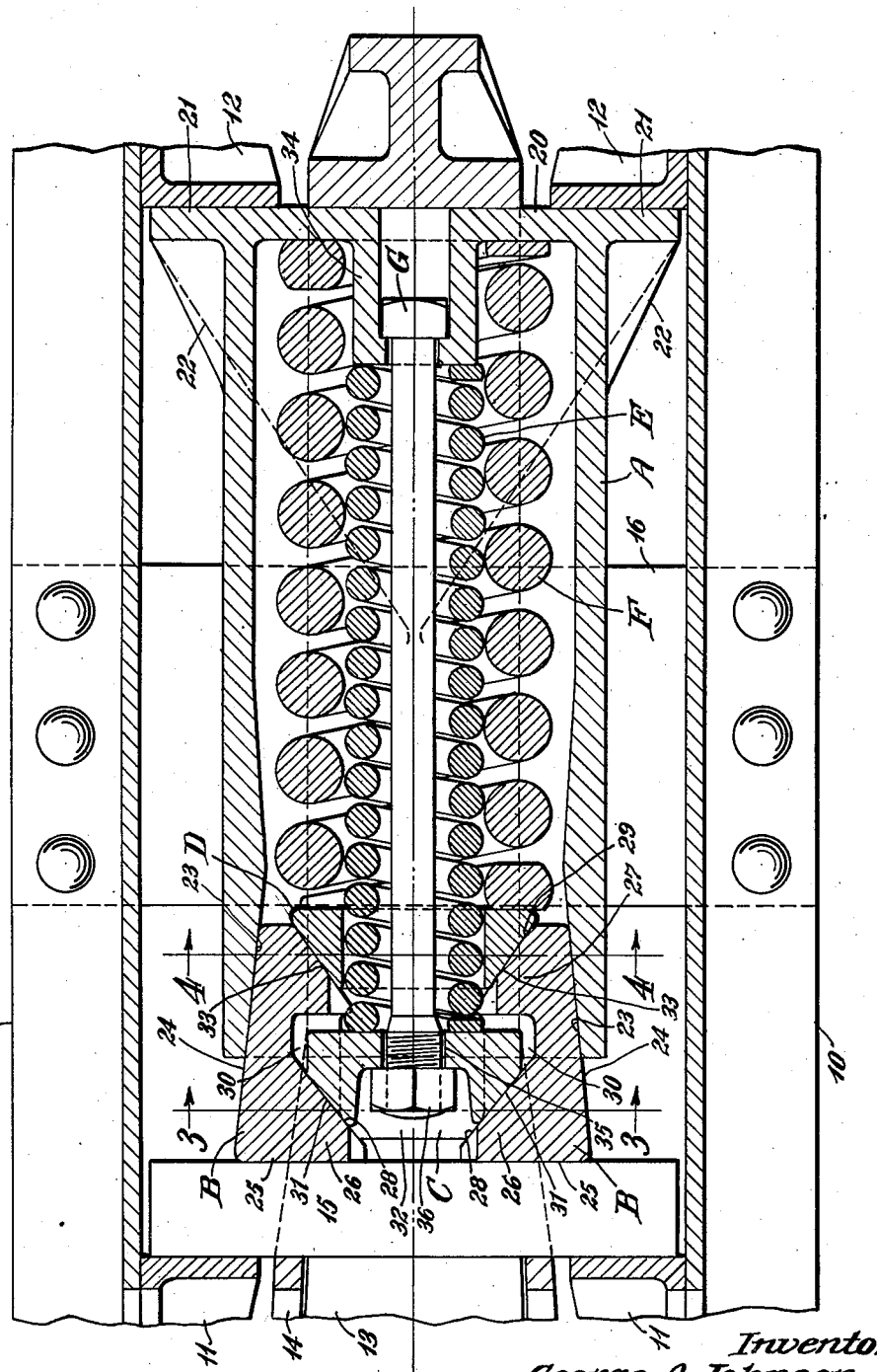
Inventor
George A. Johnson
By Henry Fuchs Atty.

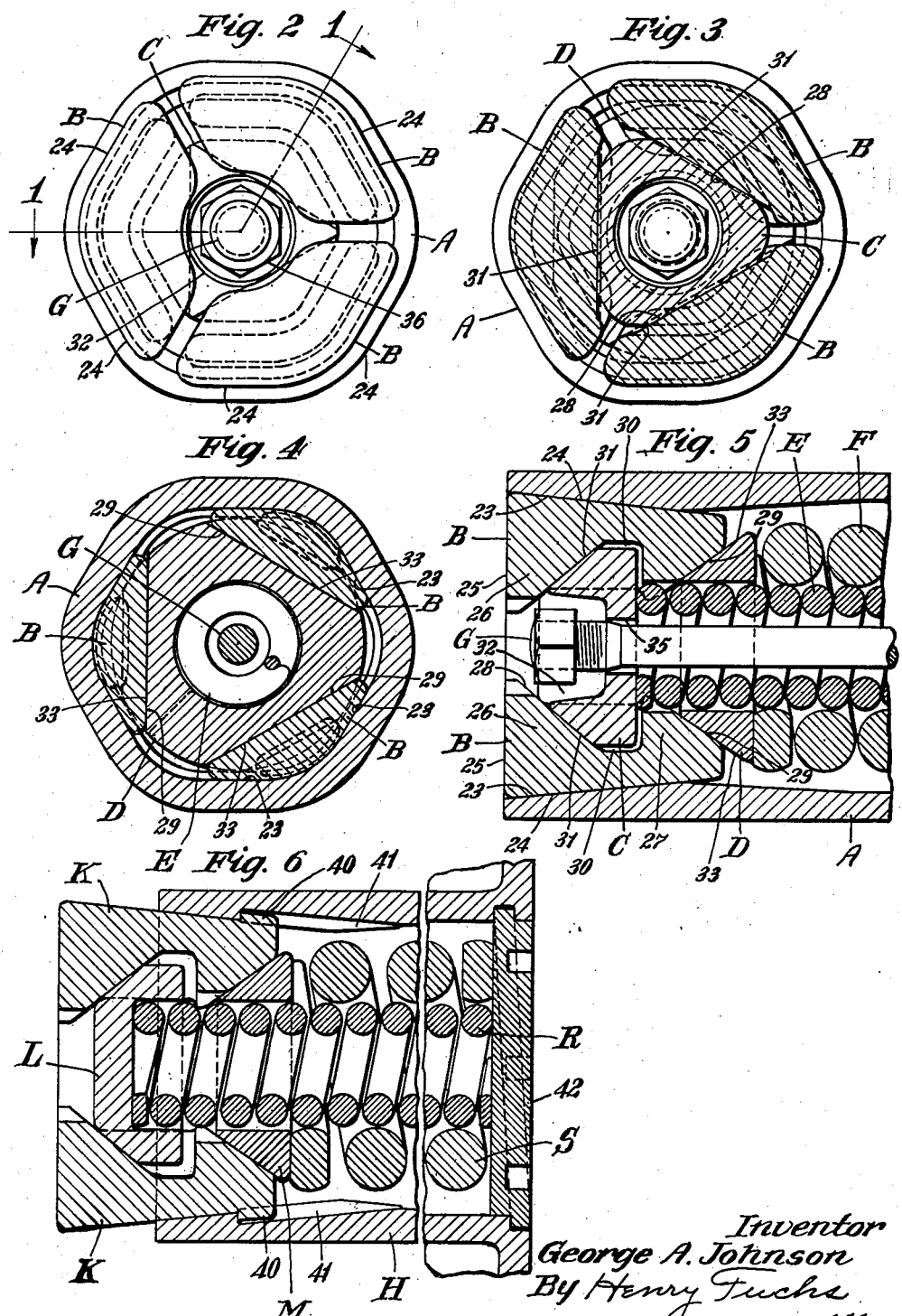

Patented Feb. 14, 1939

2,146,956

UNITED STATES PATENT OFFICE 2,146,956

FRICTION SHOCK ABSORBING MECHANISM

George A. Johnson, Chicago, Ill., assignor to W. H. Miner, Inc., Chicago, Ill., a corporation of Delaware Application February 27, 1936, Serial No. 66,015

17 Claims. (Cl. 213—32)

This invention relates to improvements in friction shock absorbing mechanism.

One object of the invention is to provide an efficient friction shock absorbing mechanism of high capacity especially adapted for use in connection with railway cars, and more particularly for the draft riggings thereof.

Another object of the invention is to provide a friction shock absorbing mechanism comprising a friction casing and cooperating shoes, together with spreading means for the shoes, wherein the spreading action on each of the shoes is balanced to assure true surface contact between the cooperating friction surfaces of the shoes and the friction member with which they engage.

A more specific object of the invention is to provide a friction shock absorbing mechanism comprising a friction casing having friction shoes cooperating therewith, wherein the shoes receive the actuating force and are pressed into frictional contact with the interior of the casing by yieldingly resisted wedge means, the shoes and wedge means being so arranged and designed that the spreading forces are properly distributed throughout the length of each of the shoes to prevent tilting of the latter and hold the same in contact with the friction surfaces of the casing.

Other objects of the invention will more clearly appear from the description and claims hereinafter following.

In the drawings forming a part of this specification, Figure 1 is a horizontal, longitudinal, sectional view through a portion of the underframe structure of a railway car, illustrating my improvements in connection therewith, the section through the friction casing and cooperating parts being on two intersecting planes at an angle of 120° to each other and corresponding substantially to the line 1—1 of Figure 2. Figure 2 is a front elevational view of the improved friction shock absorbing mechanism shown in Figure 1, the car underframe structure being omitted in said view. Figures 3 and 4 are transverse, vertical, sectional views, corresponding respectively to the lines 3—3 and 4—4 of Figure 1. Figure 5 is a view similar to Figure 1, showing the parts in different positions, the rear portion of the friction shock absorbing mechanism being broken away. Figure 6 is a broken view, similar to Figure 1, illustrating another embodiment of the invention, the friction casing and cooperating parts only being illustrated in said view.

Referring first to the embodiment of the invention illustrated in Figures 1 to 5 inclusive, 10—10 indicates the channel-shaped center or draft sills of the underframe structure of a railway car, having the usual front and rear sets of stop lugs 11—11 and 12—12 secured to the inner sides of the draft sills. The inner end portion of the coupler shank is designated by 13 and a hooded yoke 14 of well-known form is connected thereto. My improved shock absorbing mechanism proper and a front main follower 15 are disposed within the yoke and the yoke, in turn, is supported by a detachable saddle plate 16 fixed to the bottom flanges of the draft sills.

As illustrated in Figures 1 to 5 inclusive, my improved shock absorbing mechanism proper comprises broadly a combined friction shell and spring cage in the form of a casing A; three friction shoes B—B—B; a pair of combined spring followers and wedge members C and D; a main spring resistance comprising inner and outer coils E and F; and a retainer bolt G.

The casing A, which forms the combined friction shell and spring cage, is of substantially hexagonal cross section having the friction shell section formed at the forward end and the spring cage at the rear end thereof. The casing A is closed at the rear end by a transverse wall 20 which is extended laterally outwardly beyond the side walls of the casing, thereby providing flanges 21—21 which cooperate with the rear stop lugs 12—12 in the manner of the usual rear follower. The flanges 21—21 are preferably reenforced by webs 22—22 formed integral with the side walls of the casing and said flanges. The friction shell section of the casing A is provided with six interior, substantially flat, friction surfaces 23—23 which are spaced symmetrically about the longitudinal axis of the mechanism and converge inwardly of the shell section.

The friction shoes are three in number and are of similar design. Each friction shoe B is provided with a pair of angularly disposed, longitudinally extending, flat friction surfaces 24—24 on the outer side thereof which cooperate with two adjacent friction surfaces 23—23 of the friction shell. At the outer end, each shoe is provided with a flat, transverse face 25 which abuts the inner side of the follower plate 15. On the inner side, that is, the side nearest the central longitudinal axis of the mechanism, each shoe is provided with a pair of inwardly extending enlargements 26 and 27 spaced lengthwise of the shoe. As shown, the enlargements 26 and 27 are located, respectively, near the outer end and at the inner end of the shoe. Each enlargement 26 and 27 is provided with a flat wedge face inclined forwardly and inwardly toward the central axis of the mechanism. The wedge face of the enlargement 26 is indicated by 28 and that of the enlargement 27 is indicated by 29. The wedge face 29 is preferably disposed at a keener angle with respect to the longitudinal axis of the mechanism than the wedge face 28, the angularity of the wedge face 29 being preferably approximately 40° and that of the wedge face 28 approximately 50° with respect to said axis. As will be understood, the angularity of these wedge faces may be varied within wide limits to produce the desired effect during the operation of the mechanism without departing from the invention. In fact, both wedge faces may be of the same angularity. However, the wedging angle of the face of the enlargement 27 is preferably made keener than the wedging angle of the wedge face of the enlargement 26. A pocket 30, for a purpose hereinafter pointed out, is provided between the inner end of the wedge face 28 and the front end of the enlargement 27 of each shoe B.

The wedge C is in the form of a block provided with three wedge faces 31—31—31, correspondingly inclined to the wedge faces 28—28—28 of the three shoes and cooperating therewith. At the forward side, the wedge block C is provided with a seat or pocket 32 adapted to accommodate the end of the retainer bolt G.

The wedge member D is in the form of a ring and is provided with three wedge faces 33—33—33, correspondingly inclined to and adapted to engage with the wedge faces 29—29—29 of the three shoes B—B—B.

The spring resistance, which comprises the inner coil E and the outer coil F, opposes inward movement of the wedge blocks C and D. The spring F is heavier than the spring E and surrounds the latter. As shown most clearly in Figure 1, the spring F bears at its forward end on the wedge ring D and at its rear end on the back wall 20 of the casing A. A hollow boss 34, projecting inwardly from the wall 20 of the casing A, serves to center the rear end of the coil spring F and also serves as an anchorage for the retainer bolt G. The lighter spring E has its rear end bearing on the front of the boss 34. This spring extends freely through the opening of the wedge ring D and has its forward end bearing on the rear side of the wedge block C.

The retainer bolt G, which serves to hold the mechanism assembled, has a head at the rear end thereof which is anchored to the boss 34 on the wall 20 of the casing A. The shank of the bolt G extends through an opening 35 in the wedge block C. The wedge block C is anchored to the bolt G by means of a nut 36 threaded on the outer end of said bolt and seated in the pocket 32 of the wedge block C. As will be evident, the bolt G serves to hold the parts assembled by shouldered engagement of the nut thereof with the wedge block C, the shoes B—B—B being limited in their outer movement by shouldered engagement with the wedge block C before the parts are placed in the partially compressed condition between the front follower 15 and the rear stop lugs 12—12 of the draft rigging.

In the operation of my improved friction shock absorbing mechanism, the friction shoes B—B—B are forced inwardly of the shell during both draft and buff of the draft rigging. Upon a draft or pulling action being applied to the coupler 13, the casing A is pulled forwardly by the yoke 14 while the friction shoes B—B—B are held stationary through engagement with the front follower 15 which is held against movement by the front stop lugs 11—11. During a buffing action, inward movement of the coupler 13 forces the front follower 15 rearwardly, carrying the shoes B—B—B therewith while the casing A is held stationary by engagement with the rear stop lugs 12—12. Upon inward movement of the shoes B—B—B with respect to the casing A, the wedge members C and D, which are yieldingly resisted by the springs E and F, respectively, are forced into wedging engagement with the wedge faces of the shoes, thereby spreading the shoes apart and holding the same in tight frictional engagement with the friction surfaces of the casing A. Due to the taper of the casing, the shoes B—B—B will be displaced laterally inwardly toward the central longitudinal axis of the mechanism, thereby causing slippage between the wedge faces of the shoes and the wedge blocks C and D. When the shoes B—B—B have been moved inwardly of the casing A to the extent shown in Figure 5, compression of the mechanism is limited and the front follower 15 engages the front end of the casing A, the casing then acting as a solid column to transmit the forces to the stop lugs of the draft rigging, thereby relieving the friction shock absorbing mechanism from excessive strains. When the actuating force is removed, the springs E and F will force the wedge blocks C and D outwardly of the casing A and return the parts to the normal position shown in Figure 1. In this position, the outward movement of the wedge block C is limited by the retainer bolt G, and outward movement of the shoes B—B—B is limited by the front follower 15. Inasmuch as the inward movement of the wedge blocks C and D is independently resisted by the springs E and F, a certain flexibility of the mechanism is had whereby true surface contact of all of the wedge faces of the two wedges C and D with the wedge faces of the shoes is assured at all times. It is further pointed out that, due to the difference in angularity of the wedge faces of the two wedge blocks C and D and the difference in capacity of the springs E and F, the spreading action on the friction shoes B—B—B is balanced so that there is no danger of tilting of the shoes at the time that the shoes project outwardly beyond the front end of the friction casing A.

Referring next to the embodiment of the invention illustrated in Figure 6, the improved friction shock absorbing mechanism as shown therein comprises broadly a combined friction shell and spring cage H; three friction shoes K—K—K; a pair of combined spring follower and wedge block members L and M; and a spring resistance comprising inner and outer coils R and S.

The friction shock absorbing mechanism shown in Figure 6 is similar to that hereinbefore described with the exception that the retainer bolt of the latter is omitted, the friction shoes being provided with retaining lugs 40—40 engaging in interior slots 41—41 provided in the casing walls and having shouldered engagement with the outer end walls of said slots to limit outward movement of the shoes. The wedge members L and M are thus held against outward movement by engagement of the wedge faces thereof with the wedge faces of the shoes. The construction shown in Figure 6 further differs from that shown in Figures 1 to 5 inclusive in that the rear end of the casing H of the former is closed by a detachable screw threaded plug 42 which forms the rear wall of the casing instead of the casing being provided with a solid wall formed integral with the same as disclosed in Figures 1 to 5 inclusive. The screw threaded plug 42 is provided so as to permit the parts of the mechanism comprising the springs R and S, the wedge members L and M, and the shoes K—K—K to be assembled by entering the same through the open rear end of the casing. The operation of the mechanism shown in Figure 6 is the same as that of the mechanism illustrated in Figures 1 to 5 inclusive, with the exception that in release the outward movement of the shoes is arrested by the lugs 40—40 thereof coming into engagement with the shoulders at the ends of the slots of the casing H. The outward movement of the shoes K—K—K is thus positively limited and the mechanism is held of uniform overall length. By omitting the retainer bolt provided in the first form of the invention described, it is possible to employ a longer inner spring in the device shown in Figure 6 because the boss on the rear wall of the casing which accommodates the headed end of the retainer bolt may be entirely omitted.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior friction surfaces; of a set of friction shoes slidably engaging said friction surfaces; a pair of wedge members, each member having wedging engagement with all of the shoes of said set; and cushioning means reacting between the casing and each wedge member forcing said wedge member outwardly against said shoes and opposing inward movement of said wedge members.

2. In a friction shock absorbing mechanism, the combination with a friction casing having interior friction surfaces; of a set of friction shoes adapted to receive the actuating force, said shoes having sliding engagement with the friction surfaces of the casing; and means opposing movement of said set of shoes inwardly of the casing including a pair of wedge members, each member having wedging engagement with all of the shoes of said set and cushioning means reacting between the casing and each wedge member and yieldingly opposing movement of said wedge members inwardly of the casing by said set of friction shoes.

3. In a friction shock absorbing mechanism, the combination with a friction casing having interior friction surfaces; of a set of friction shoes movable lengthwise of the casing and having frictional engagement with said interior surfaces of the casing, said shoes having two sets of opposed, inwardly diverging wedge faces, each shoe having one wedge face of each set thereon; and means opposing inward movement of said shoes including a pair of wedge members, one of said members having wedging engagement with one of said sets of wedge faces of said shoes, and the other of said members having wedging engagement with the other set of wedge faces of said shoes, a spring reacting between the casing and one of said wedge members, and a second spring reacting between the casing and the other wedge member.

4. In a friction shock absorbing mechanism, the combination with a friction casing having interior friction surfaces; of a set of friction shoes movable lengthwise of the casing and having frictional engagement with said interior friction surfaces of the casing; and means opposing inward movement of said shoes including a pair of wedge members each having wedging engagement with all of the shoes of said set on cooperating wedge faces inclined rearwardly away from the central longitudinal axis of the mechanism, and a pair of springs, one of said wedge members being disposed outwardly beyond the other wedge member, one of said springs reacting between the casing and said last named wedge member, and the other spring reacting between the casing and the other wedge member.

5. In a friction shock absorbing mechanism, the combination with a friction casing having interior friction surfaces; of friction shoes movable lengthwise of the casing and having frictional engagement with said interior surfaces of the casing; and means opposing inward movement of said shoes including a pair of separate wedge members, each having wedging engagement with all of said shoes along surfaces inclined rearwardly away from the longitudinal central axis of the mechanism and separate cushioning means reacting between the casing and each wedge member and yieldingly opposing movement of said wedge members inwardly of the casing.

6. In a friction shock absorbing mechanism, the combination with a friction casing having interior friction surfaces; of friction shoes movable lengthwise of the casing and having frictional engagement with said interior surfaces of the casing; and means opposing inward movement of said shoes including a pair of wedge members having wedging engagement with said shoes and cushioning means reacting between the casing and said wedge members, the wedging angles between said shoes and one of said wedge members being greater than the wedging angle between said shoes and the other wedge member.

7. In a friction shock absorbing mechanism, the combination with a friction casing having interior friction surfaces; of a set of friction shoes movable lengthwise of the casing and having frictional engagement with said interior surfaces of the casing, said shoes having two sets of opposed wedge faces, said sets being respectively at the outer and inner ends of said shoes, and the faces of each set diverging inwardly of the mechanism; and means opposing inward movement of said set of shoes including a pair of wedge members having wedging engagement respectively with the two sets of wedge faces of said set of shoes, a spring reacting between said casing and one of said wedge members, and a second spring reacting between the casing and the other wedge member, one of said springs being of greater capacity than the other.

8. In a friction shock absorbing mechanism, the combination with a friction casing having interior friction surfaces; of friction shoes movable lengthwise of the casing and having frictional engagement with said interior surfaces of the casing; and means opposing inward movement of said shoes including a wedge member having wedging engagement with the inner ends of the shoes, a wedge member having wedging engagement with the outer ends of the shoes, a spring reacting between the casing and said first named wedge member, and a spring reacting between the casing and said second named wedge member, said inner wedge member having keener wedging engagement with said shoes than said outer wedge member.

9. In a friction shock absorbing mechanism, the combination with a friction casing having interior friction surfaces; of friction shoes movable lengthwise of the casing and having frictional engagement with said interior surfaces of the casing, each shoe having longitudinally spaced wedge faces all inclined rearwardly away from the longitudinal central axis of the mechanism; and means opposing inward movement of said shoes including a wedge member having wedging engagement with the wedge faces nearest the inner ends of the shoes, a wedge member having wedging engagement with the wedge faces nearest the outer ends of the shoes, a relatively heavy spring reacting between the casing and said first named wedge member, and a relatively lighter spring reacting between the casing and said second named wedge member.

10. In a friction shock absorbing mechanism, the combination with a friction casing having interior friction surfaces; of friction shoes movable lengthwise of the casing and having frictional engagement with said interior surfaces of the casing; and means opposing inward movement of said shoes including a wedge member having wedging engagement with the inner ends of the shoes, a wedge member having wedging engagement with the outer ends of the shoes, a relatively heavy spring reacting between the casing and said first named wedge member, and a relatively lighter spring reacting between the casing and said second named wedge member, said inner wedge member having keener wedging engagement with said shoes than said outer wedge member.

11. In a friction shock absorbing mechanism, the combination with a friction casing having interior friction surfaces; of a set of friction shoes having sliding movement on said friction surfaces in a direction lengthwise of the casing; and means opposing movement of said shoes inwardly of the casing including a central wedge member having wedging engagement with each of said shoes adjacent to the outer ends of the latter, and yielding means reacting between said wedge member and casing; and additional means opposing movement of said set of shoes inwardly of the casing, including a second central wedge member having wedging engagement with each of said shoes at their inner ends, and yielding means reacting between said casing and said second named wedge member.

12. In a friction shock absorbing mechanism, the combination with a friction casing having interior friction surfaces; of a set of friction shoes having sliding movement on said friction surfaces in a direction lengthwise of the casing, the shoes of said set each having front and rear wedge faces, said front faces of opposed shoes diverging rearwardly of the mechanism and said rear faces of opposed shoes diverging rearwardly of the mechanism; and spreading means opposing movement of said shoes inwardly of the casing including a combined spring follower and wedge member having wedging engagement with front wedge faces of all of said shoes, a wedge ring having wedging engagement with the rear wedge faces of all of said shoes, spring resistance means reacting between said casing and wedge ring, and additional spring resistance means extending through said wedge ring and reacting between the casing and said wedge member.

13. In a friction shock absorbing mechanism, the combination with a column member having longitudinally disposed friction surfaces; of a plurality of friction shoes having sliding engagement with said friction surfaces; and means yieldingly opposing inward movement of said shoes on said column member including a wedge member having wedging engagement with each of said shoes near the outer end thereof on an inclined face, a second wedge member having wedging engagement with each of said shoes near the inner end thereof on a face inclined in the same general direction as said first named face, a spring reacting between said column and said first named wedge member to oppose relative movement thereof, and a second spring reacting between said column member and said second named wedge member to oppose relative movement thereof.

14. In a friction shock absorbing mechanism, the combination with a friction casing having interior friction surfaces; of a set of friction shoes engaging said friction surfaces, each shoe having a pair of correspondingly facing inclined wedge surfaces; a spring follower having wedging engagement with one of said surfaces of each shoe of said set; a second spring follower disposed inwardly of said first named spring follower and having wedging engagement with the other of said surfaces of each shoe of said set; and a spring reacting between said casing and said first named spring follower, a separate spring reacting between said casing and second named spring follower.

15. In a friction shock absorbing mechanism, the combination with a friction casing having interior friction surfaces; of friction shoes engaging said friction surfaces; a spring follower having wedging engagement with the shoes; a second spring follower disposed inwardly of said first named spring follower and having wedging engagement with said shoes; a spring reacting between said casing and said first named spring follower; a separate spring reacting between said casing and said second named spring follower; and retaining means on said casing having shouldered engagement with said shoes for limiting outward movement of the latter.

16. In a friction shock absorbing mechanism, the combination with a friction casing of hexagonal cross section having interior friction surfaces; of a plurality of friction shoes within the casing, each shoe having frictional engagement with two adjacent friction surfaces of said casing, each shoe having a pair of wedge faces on the inner side thereof, said wedge faces facing rearwardly and being arranged respectively at the outer and inner ends of said shoe; a wedge member cooperating with the wedge faces at the outer ends of said shoes; a second wedge member cooperating with the wedge faces at the inner ends of said shoes; a spring reacting between said casing and said first named wedge member; and a second spring reacting between said casing and the second named wedge member.

17. In a friction shock absorbing mechanism, the combination with a friction casing having interior, inwardly converging friction surfaces; of a set of friction shoes cooperating with said friction surfaces, each shoe having front and rear, rearwardly facing, inclined wedge faces; and means yieldingly opposing inward movement of said shoes including a pair of spring follower members each having a set of forwardly facing, inclined wedge faces, the wedge faces of one of said followers engaging the front wedge faces of said shoes, and the wedge faces of the other follower engaging the rear faces of said shoes, yielding means reacting between said casing and one of said followers and opposing inward movement of said follower, and separate yielding means reacting between said casing and the other spring follower and opposing inward movement of the latter.

GEORGE A. JOHNSON.